United States Patent
Kong et al.

(10) Patent No.: US 7,248,249 B2
(45) Date of Patent: Jul. 24, 2007

(54) TOUCH PANEL APPARATUS AND METHOD FOR CONTROLLING THE SAME

(75) Inventors: Nam Young Kong, Sungnam-shi (KR); Chun Suck Lee, Suwon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 747 days.

(21) Appl. No.: 10/670,739

(22) Filed: Sep. 26, 2003

(65) Prior Publication Data

US 2004/0090431 A1 May 13, 2004

(30) Foreign Application Priority Data

Nov. 13, 2002 (KR) .................... 10-2002-0070311

(51) Int. Cl.
*G08C 21/00* (2006.01)
(52) U.S. Cl. .................. 345/173; 345/156; 345/174; 345/177; 178/18.01; 178/19.04; 338/47; 341/34
(58) Field of Classification Search ............... 345/156, 345/173, 174, 177; 178/18.01, 18.03, 18.1, 178/19.04; 338/47; 341/34
See application file for complete search history.

(56) References Cited

U.S. PATENT DOCUMENTS

| 5,241,308 | A | * | 8/1993 | Young ........................ 341/34 |
| 5,854,450 | A | * | 12/1998 | Kent ....................... 178/18.04 |
| 6,239,790 | B1 | * | 5/2001 | Martinelli et al. .......... 345/174 |
| 2002/0113779 | A1 | * | 8/2002 | Itoh et al. .................... 345/173 |
| 2002/0175836 | A1 | * | 11/2002 | Roberts ........................ 341/34 |
| 2002/0180710 | A1 | * | 12/2002 | Roberts ..................... 345/173 |
| 2003/0063073 | A1 | * | 4/2003 | Geaghan et al. ............ 345/173 |

OTHER PUBLICATIONS

JP 02002278699A; Pub. Date Sep. 27, 2002; Shimizu, Satoshi.*

* cited by examiner

*Primary Examiner*—Bipin Shalwala
*Assistant Examiner*—Vincent E. Kovalick
(74) *Attorney, Agent, or Firm*—McKenna Long & Aldridge LLP

(57) ABSTRACT

A touch panel apparatus includes a touch panel for recognizing a contact position and a touch panel controller for computing a coordinate value corresponding to the contact position on the touch panel, wherein an activation force is set to a value between 80 g~150 g, and the touch panel controller compensates for an error of the coordinate value due to double touching of the touch panel.

24 Claims, 7 Drawing Sheets

TOUCH PANEL APPARATUS AND METHOD FOR CONTROLLING THE SAME

The present invention claims the benefit of the Korean Patent Application No. P2002-70311 filed in Korea on Nov. 13, 2002, which is hereby incorporated by reference.

BACKGROUND OF THE INVENTION

1. Field of the Invention

The present invention relates to a touch panel, and more particularly to a touch panel apparatus and method for controlling the same capable of preventing touching error due to double touching.

2. Description of the Related Art

With respect to a display representing pictures, there are a cathode ray tube, a liquid crystal display, a plasma display panel, and an electro-luminescence display, and so on. In order to input information with ease on the screen, if the user presses the surface with a pen or a finger, such a display is used as an input device by setting on the screen surface a touch panel inputting information corresponding to touching position.

FIG. 1 is a diagram illustrating a touch panel apparatus according to the related art. Referring to FIG. 1, the conventional touch panel apparatus comprises a touch panel 10 for providing the coordinate signal of a touch point, and a touch panel controller 30 for controlling the driving of the touch panel 10 and computing the coordinate value in accordance with the coordinate signal from the touch panel 10 and providing it to a system 40.

The touch panel 10 includes an upper film 12 having a first transparent conductive layer formed thereon, and a lower substrate 16 separated from the upper film 12 and having a second transparent conductive layer 18 formed thereon.

The upper film 12 and the lower substrate 16 are joined by a sealant 22 spread along a non-touch region, specifically the peripheral region, and are thus separated by the height of the sealant 22. Further, for separation of the upper film 12 and the lower substrate 16 in the touch region, a plurality of dot spacers 20 are formed on the first transparent conductive layer 14 of the upper film 12 or the second transparent conductive layer 18 of the lower substrate 16.

A transparent film using the polyethylene terephthalate (PET) is mainly used as the contact material for pressing on the upper film 12 with a pen or a finger. The same material used for the upper substrate is also for the lower substrate 16. A similar material like a glass substrate or plastic substrate may be also used. Transparent conductive materials like Indium-Tin-Oxide (ITO), Indium-Zine-Oxide (IZO), and Indium-Tin-Zine-Oxide (ITZO) are used for the first and the second transparent conductive layer 14 and 18.

The touch panel 10 further comprises an X-electrode bar 15 connected to the both sides of X-axis direction of the first transparent conductive layer 14 and a Y-electrode bar 19 connected to the both sides of Y-axis direction of the second transparent conductive layer 18. The X-electrode bar 15 has a first X-electrode bar 15A supplying the driving voltage (Vcc) and a second X-electrode bar 15B supplying the ground voltage (GND) so that the current may flow along the X-direction in the first transparent conductive layer 14. The Y-electrode bar 19 has a first Y-electrode bar 19A supplying the driving voltage (Vcc) and a second Y-electrode bar 19B supplying the ground voltage (GND) so that the current may flow along the Y-axis direction in the second transparent conductive layer 16.

When the pen or the finger presses the upper film 12, the first transparent conductive layer 14 is contacted with the second transparent conductive layer 18, and the touch panel generates the current signal or the voltage signal where the resistance is different in accordance with the touch location. The coordinate signal of the current or the voltage changed in accordance with the touch location is output as X-axis coordinate signal through the second X-electrode bar 15B connected to the first transparent conductive layer 14, and is output as Y-axis coordinate signal through the second Y-electrode bar 19B connected to the second transparent conductive layer 18. Here the touch panel 10 outputs sequentially the X-axis coordinate signal and Y-axis coordinate signal by control of a touch panel controller 30.

The generation of the coordinate signal is explained more fully hereinafter. If each of the driving voltage (Vcc) and the ground voltage (GND) is supplied to the X-electrode bar 15 through a first and a second switches 24 and 26 respectively, the touch panel 10 outputs the X-axis coordinate signal through the second X-electrode bar 15B in response to the resistance value changed by the point where the first and the second transparent conductive layer 14 and 18 are contacted. Subsequently, if each of the driving voltage (Vcc) and the ground voltage (GND) is supplied to the Y-electrode bar 19 through a first and a second switches 24 and 26 respectively, the touch panel 10 outputs the Y-axis coordinate signal through the second Y-electrode bar 19B in response to the resistance value changed by the point where the first and the second transparent conductive layer 14 and 18 are contacted. For this purpose, the first switch 24 supplies the driving voltage (Vcc) to either the first X-electrode bar 15A or the first Y-electrode bar 19A in response to the control signal (CS) from the touch panel controller 30 and the second switch 26 supplies the ground voltage (GND) to either the second X-electrode bar 15B or the second Y-electrode bar 19B in response to the control signal (CS) from the touch panel controller 30.

The touch panel controller 30 computes the coordinate value in accordance with the X-axis coordinate signal and the Y-axis coordinate signal of the touch point supplied from the touch panel 10 and supplies it to the system 40. Moreover, the touch panel controller 30 controls the first and the second switches 24 and 26 in accordance with the X-axis and Y-axis coordinate modes respectively and controls power supply (Vcc, GND) of the touch panel 10. For this purpose, the touch panel controller 30 includes an analog/digital converter 32 (hereinafter referred to as "ADC") for converting the X-axis and Y-axis coordinate signals from the touch panel 10 to the digital data, a microcomputer 34 for computing the coordinate value by the combination of X-axis and Y-axis coordinate data from the ADC 32 and outputting it to system 40, an interface part 36 for relaying the coordinate value from microcomputer 34 and supplying it to the system 40. The ADC 32 converts each the X-axis coordinate signal and the Y-axis coordinate signal supplied sequentially from the touch panel 10 into the digital data to provide it to the microcomputer 34. The microcomputer 34 combines the X-axis and the Y-axis coordinate data supplied sequentially from the ADC 32, computes the coordinate value corresponding to the touch location of the touch panel 10, and then supplies the computed value to the system 40 through the interface part 36. Further, the microcomputer 34 generates the control signal (CS) every fixed period of time and controls the first switch 24 and the second switch 26.

The system 40 perceives the coordinate value supplied from the touch panel controller 30, executes its corresponding instructions by the coordinate value or operates the application program related with it. Further, the system 40 supplies a necessary power source signal and video data to the display (not shown) mounted on the surface of the touch panel 10.

The touch panel as described above executes the instructions corresponding to the coordinate value in the system 40 by means of detecting the coordinate value pressed by the pen or finger and transmitting it to the system. However, in the touch panel 10 double touching with the palm in conjunction with the pen or the finger may occur frequently. If such double touching occurs, it is difficult to detect exactly the real touch location corresponding to the pen or the finger location.

FIG. 2 is a diagram illustrating a double touching event on a touch panel according to the related art. As depicted in FIG. 2, when the touch panel 10 is doubly touched by the user's palm in conjunction with the pen, both of the pen touch point (PT) and the hand touch point (HT) are detected in touch panel 10. In this case, the pen touch point (PT) and the hand touch point (HT) may occur at the same time or occur within fixed time difference. When the pen touch point (PT) and the hand touch point (HT) occur at the same time, the touch panel 10 generates the coordinate signal of the middle position between two points (PT, HT). If the coordinate signal of the middle position is provided to the touch panel controller 30, each of the touch panel controller 30 and the system 40 recognizes erroneously the middle position as the pen touch point. On the contrary, if a hand touch point (HT) occurs subsequently to the pen touch point (PT), the touch panel 10 generates a first coordinate signal for the pen touch point (PT) at the position where the pen touches the panel, and then a second coordinate signal occurs at the middle position between the pen touch point (PT) and the hand touch point (HT). As described above, if the first coordinate signal corresponding to the real touch point and the second coordinate signal corresponding to the middle position of the double touching by the hand are inputted to the touch panel controller 30 sequentially, in case that the first and the second coordinate signal occur within the fixed time, for example 3.4 ms, the touch panel controller 30 computes the coordinate value for the second coordinate signal inputted later and supplies the second coordinate signal to the system 40. In this case, the system 40 recognizes erroneously the middle position of the double touching as the pen touch point (PT).

As described above, one important reason why double touching occurs often is associated with the force applied to the touch panel 10. Specifically, the value of the force recognized as a valid touch, more specifically the activation force (AF) is set to have small value. The activation force (AF) is defined in accordance with Equation 1:

$$AF = \rho H/L \quad (1)$$

wherein $\rho$ is a constant thickness of a material of the upper film 12, and 'H' and 'L', as depicted in FIG. 3, are respectively the height of the spacer 20, and the pitch between adjacent spacers respectively.

Referring to the Equation 1, the activation force (AF) can be adjusted in accordance with the height and the thickness of the spacers 20, and the material characteristic of the upper film 12.

In general although the activation force (AF) of the touch panel 10 is set around 30 g~80 g in order to improve the touch perception, the activation force having this amount, as described above, leads to double touching. In order to reduce the occurrence of double touching, the touch panel 10 is fabricated with a reinforced activation force (AF) of more than 150 g. But if the activation force is increased to more than 150 g, since the touching force accordingly, touching of panel 10 becomes a difficult operation.

SUMMARY OF THE INVENTION

Accordingly, the present invention is directed a touch panel apparatus and method for controlling the same that substantially obviates one or more of the problems due to limitations and disadvantages of the related art.

An object of the present invention to provide a touch panel apparatus wherein a touching error due to double touching may be prevented.

Another object of the present invention to provide a touch panel apparatus wherein a touching error due to double touching may be compensated.

Another object of the present invention to provide a method for controlling a touch panel apparatus and preventing a touching error due to double touching of the touch panel.

Another object of the present invention to provide a method for controlling a touch panel apparatus and compensating a touching error due to double touching of the touch panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch panel apparatus includes a touch panel for recognizing a contact position, and a touch panel controller for computing a coordinate value corresponding to the contact position on the touch panel, wherein an activation force is set to a value between 80 g~150 g, and the touch panel controller compensates for an error of the coordinate value due to double touching of the touch panel.

In another aspect, a touch panel apparatus includes a touch panel for recognizing a contact position on the touch panel and a touch panel controller for computing a coordinate value corresponding to the contact position on the touch panel, wherein an activation force is set to a value between 80 g~150 g, and the touch panel rejects one of a plurality of coordinate values when double touching generates the plurality of coordinate values.

In another aspect, a method for controlling a touch panel apparatus includes the steps of specifying a value for an activation force to be used as a reference for recognizing when the touch panel is touched at a touching position, computing a coordinate value corresponding to the touching position on the touch panel, and compensating an error of the coordinate value due to double touching of the touch panel.

In another aspect, a method for controlling a touch panel apparatus includes the steps of specifying a value for an activation force to be used as a reference for recognizing when the touch panel is touched at a touching position on the touch panel, computing a coordinate value corresponding to the touching position on the touch panel and rejecting one of a plurality of coordinate values when double touching of the panel generates the plurality of coordinate values.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
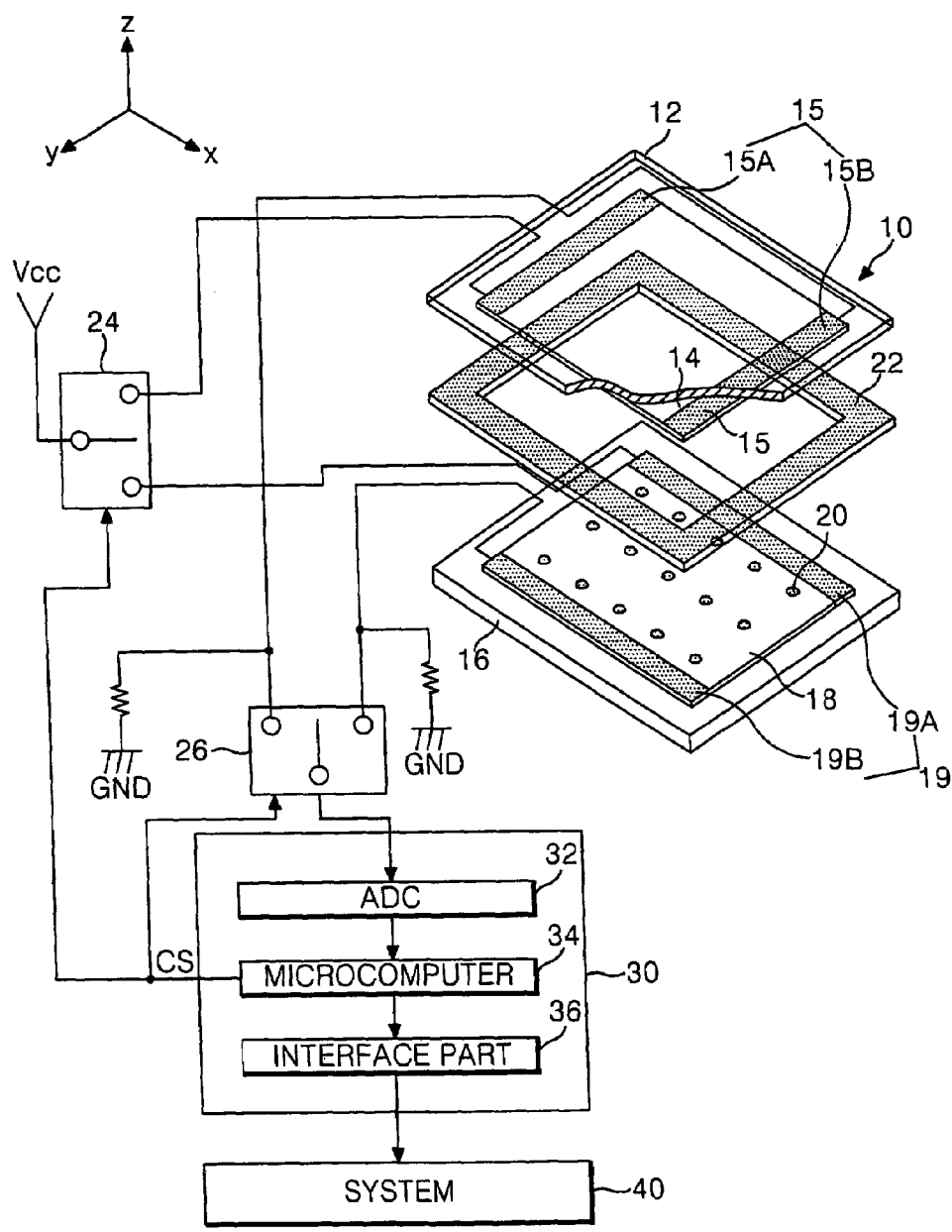
FIG. 1 is a diagram illustrating a touch panel apparatus according to the related art.
Figure 2:
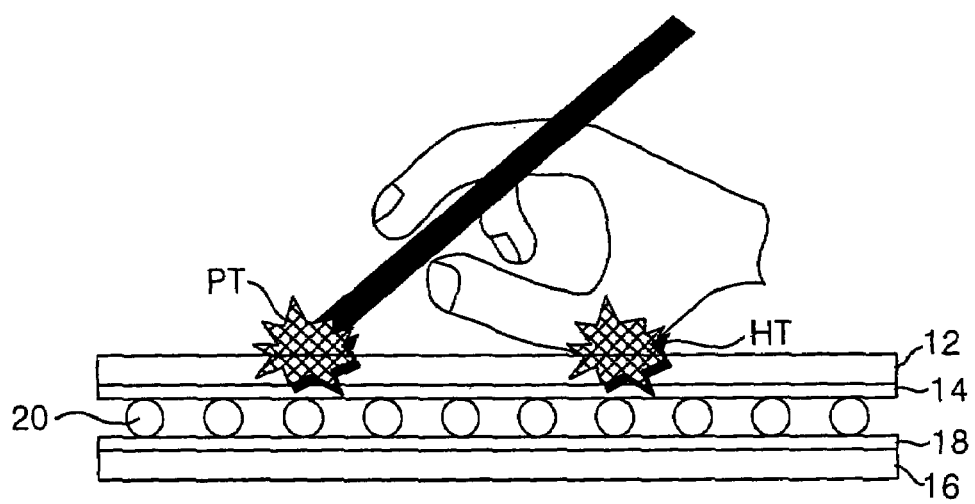
FIG. 2 is a diagram illustrating a double touching event on a touch panel according to the related art.
Figure 3:
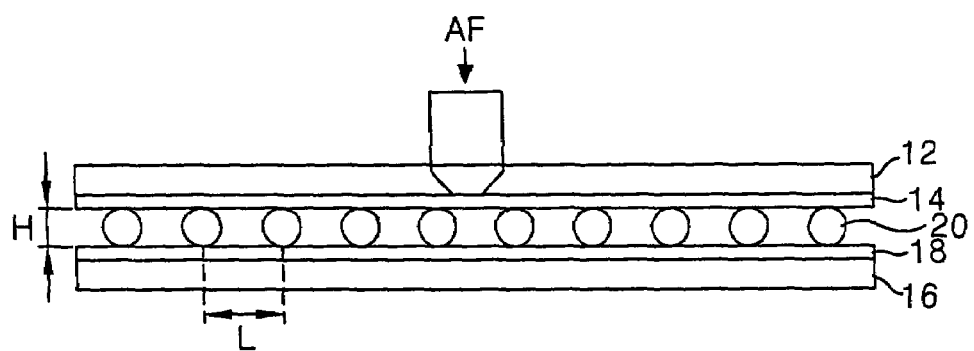
FIG. 3 is a cross sectional view illustrating schematically a part of the touch panel and a pen touching the touch panel in order to explain the activation force of the touch panel according to the related art.
Figure 4:
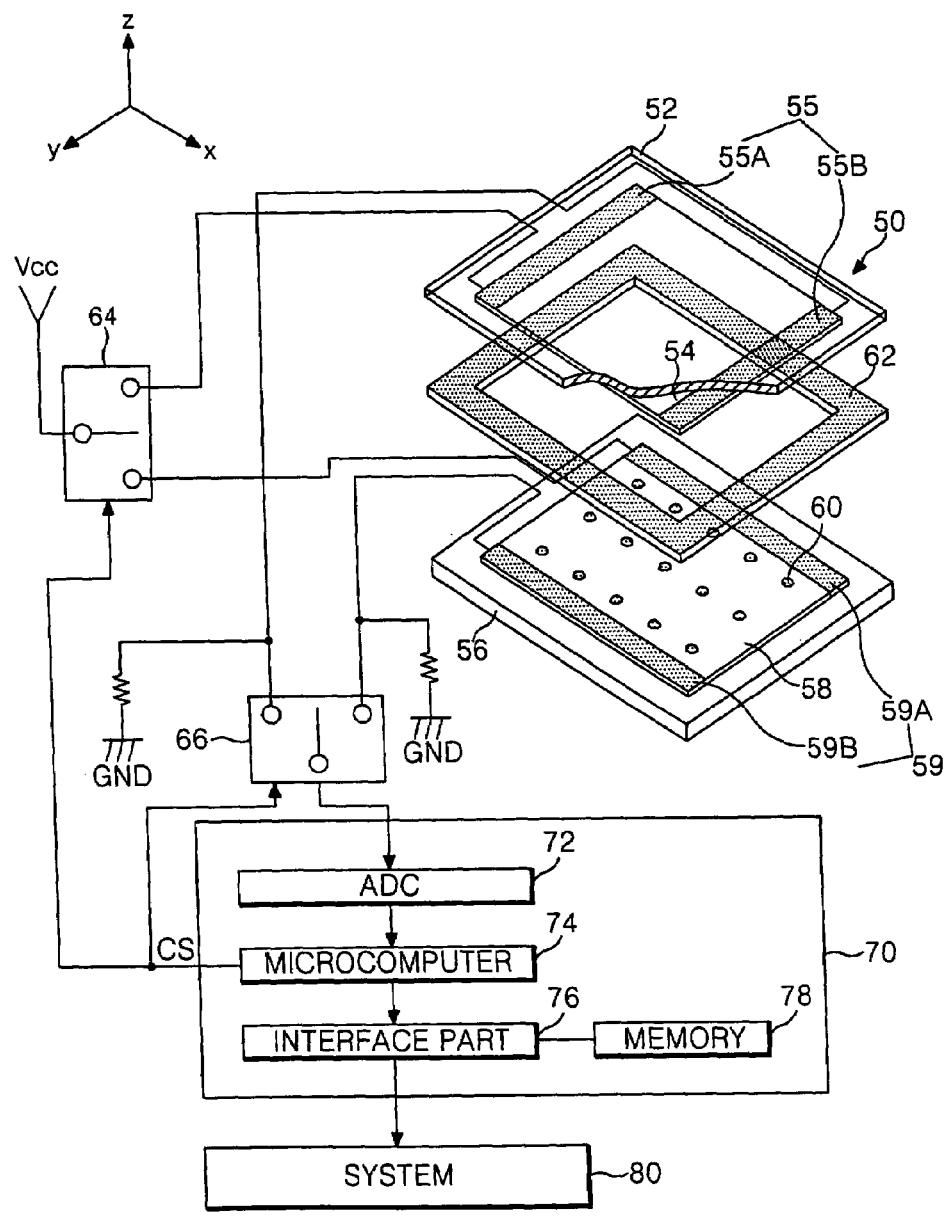
FIG. 4 is a diagram illustrating an exemplary touch panel apparatus according to an embodiment of the present invention.

FIG. 4 is a diagram illustrating an exemplary touch panel apparatus according to an embodiment of the present invention. Referring to FIG. 4, a touch panel apparatus may include a touch panel 50 having an activation force (AF) of about 80 g~150 g in some region, and a touch panel controller 70 for controlling the touch panel 50 and computing the coordinate value in accordance with the coordinate signal received from the touch panel 50 and providing it to a system 80.

The touch panel 50 may include an upper film 52 having a first transparent conductive layer 54 formed thereon, and a lower substrate 56 having a second transparent conductive layer 58 formed thereon and separated from the upper film 52.

The upper film 52 and the lower substrate 56 may be combined by a sealant 62 spread along an outline that defines a non-touch region, and are separated by a height of the sealant 62. Moreover, in order to separate the upper film 52 and the lower substrate 56 in the touch region, a plurality of dot spacers 60 may be formed on the first transparent conductive layer 54 of the upper film 53 or on the second transparent conductive layer 58 of the lower substrate 56. According to Equation 1, the height (H) of each of the dot spacers 60 and a space therebetween may beset so that the activation force (AF) reaches about 80 g to 150 g within the entire touch region or a portion of the touch region of the touch panel 50. Furthermore, in accordance with Equation 1, a material constituting the upper film 52 and a thickness thereof may be selected so that the activation force (AF) reaches about 80 g to 150 g.

A transparent film using polythylene terephthalate (PET), for example, may be used as the upper film 52 that is pressed by the pen or finger. A transparent film of glass substrate, or the same plastic substrate of the upper film 52 may be used as the lower substrate 56. Furthermore, one of Indium-Tin-Oxide (ITO), Indium-Zine-Oxide (IZO), and Indium-Tin-Zine-Oxide (ITZO) may be used as the first and the second transparent conductive layer 54 and 58.

The touch panel 50 may further include an X-electrode bar 55 connected to both sides of the panel oriented along the X-axis direction of the first transparent conductive layer 54. Similarly, the touch panel may further include a Y-electrode bar 59 connected to both sides of the panel oriented along the Y-axis direction of the second transparent conductive layer 58. The X-electrode bar 55 may include a first X-electrode bar 55A supplying the driving voltage (Vcc) and a second X-electrode bar 55B for supplying the ground voltage (GND) so that the current may flow along the X-axis direction in the first transparent conductive layer 54. The Y-electrode bar 59 may include a first Y-electrode bar 59A for supplying the driving voltage (Vcc) and a second Y-electrode bar 59B for supplying the ground voltage (GND) so that the current may flow along the Y-axis direction in the second transparent conductive layer 56.

If the pen or finger presses the upper film 52, and the first transparent conductive layer 54 contacts the second transparent conductive layer 58, the touch panel 50 may generate a current signal or a voltage signal where the resistance changes in accordance with the position of touch point. A coordinate signal corresponding to the change in the current or the voltage associated with the touch point may be produced as an X-axis coordinate signal through the second X-electrode bar 55B connected to the first transparent conductive layer 54, and produced as a Y-axis coordinate signal through the second Y-electrode bar 59B connected to the second transparent conductive layer 54. Hereinafter, the touch panel 50 may control a touch panel controller 70, and may sequentially output the X-axis coordinate signal and the Y-axis coordinate signal.

Hereinafter, the generation of the coordinate signal may be explained in further detail. If the driving voltage (Vcc) and the ground voltage (GND) are supplied to the X-electrode bar 55 through the first and the second switches 64 and 66, in response to the change in resistance value corresponding to the location where the first and the second transparent conductive layer 54 and 58 are contacted, the touch panel 50 may produce the X-axis coordinate signal through the second X-electrode bar 55B. Moreover, if the driving voltage (Vcc) and the ground voltage (GND) are supplied to the Y-electrode bar 59 through the first and the second switches 64 and 66, in response to the change in resistance value associated with the location where the first and the second transparent conductive layer 54 and 58 are contacted, the touch panel 50 may produce the Y-axis coordinate signal through the second Y-electrode bar 59B. The first switch 64 may supply the driving voltage (Vcc) to the first X-electrode bar 55A or to the first Y-electrode bar 59A in response to the control signal (CS) received from the touch panel controller 70. The second switch 66 may supply the ground voltage (GND) to the second X-electrode bar 55B or to the second Y-electrode bar 59B in response to the control signal (CS) received from the touch panel controller 70.

The touch panel controller 70 may compute the coordinate value in accordance with the X-axis and the Y-axis coordinate signal of the touch point supplied by the touch panel 50 and may supply it to the system 80. Moreover, the touch panel controller 70 may control the first and the second switches 64 and 66 and may control the power supply (Vcc, GND) so applied to the touch panel 50. Further, the touch panel controller 70 may compensate the error in coordinate value due to the hand touching the panel when double touching occurs. For this purpose, the touch panel controller 70 may include an ADC 72 for converting the X-axis and the Y-axis coordinate signals received from the touch panel 50 into digital data, a microcomputer 74 which may compute the coordinate value as combinations of the X-axis and the Y-axis coordinate data received from the ADC 72 and may provide it to the system 80, a memory 78 for storing the coordinate value computed from the microcomputer 74, and an interface part 76 that relays the coordinate values from the microcomputer 74 and supplies them to the system 80. The ADC 72 may convert the X-axis and the Y-axis coordinate signal sequentially supplied from the touch panel 50, respectively, into the digital data, and then output it.

The microcomputer 74 may combine the X-axis and the Y-axis coordinate data sequentially supplied from the ADC 72, compute the coordinate values corresponding to the touch location of the touch panel 50, and may supply the computed coordinate values to the system 80 through the interface part 76. The microcomputer 74 may output the computed coordinate value periodically in accordance with a fixed time period, for example 3.4 ms~5 ms. Furthermore, the microcomputer 74 may generate the control signal (CS) in accordance with the fixed time period, and may control the power supply switches 64 and 66 by using the control signal (CS). The first switch 64 may supply the driving voltage (Vcc) either to the first X-electrode bar 55A or to the first Y-electrode bar 59A in response to control signal (CS). The second switch 66 may supply the ground voltage (GND) either to the second X-electrode bar 55B or to the second Y-electrode bar 59B in response to the control signal (CS).

The microcomputer 74 may distinguish between double touching generated in the touch panel 50. Specifically, the microcomputer 74 may distinguish between the coordinate values associated with the pen or the finger and the coordinate values associated with the hand touching position, and may compute the exact coordinate values for the pen or the finger touch point by compensating the coordinate values associated with the hand touch, or may reject them. For this purpose, after microcomputer 74 detects the first location coordinate values, if the second location coordinate values are received from the touch panel 50 within the time period for detecting the next coordinate values, the microcomputer 74 determines whether the second location coordinate values exceed preset double touch reference values. Herein, the double touch reference values may be minima of the coordinate values of the midpoint between the coordinate values of the pen or the finger touch point and the coordinate values of the hand touch point, within an area where double touching can occur.

For example, the double touch reference value of X-axis coordinate values may be set to 60, and the double touch reference value of Y-axis coordinate values may be set to 80. The double touch reference values change in accordance with a right hand mode when the user is right-handed, or a left hand mode when the user is left-handed. Depending on whether the user is right-handed or left-handed, the direction of hand touch with respect to the actual location of the pen or finger will differ. Moreover, depending on whether the user is right-handed or left-handed, the region where double touching occurs also differs.

Figure 5:
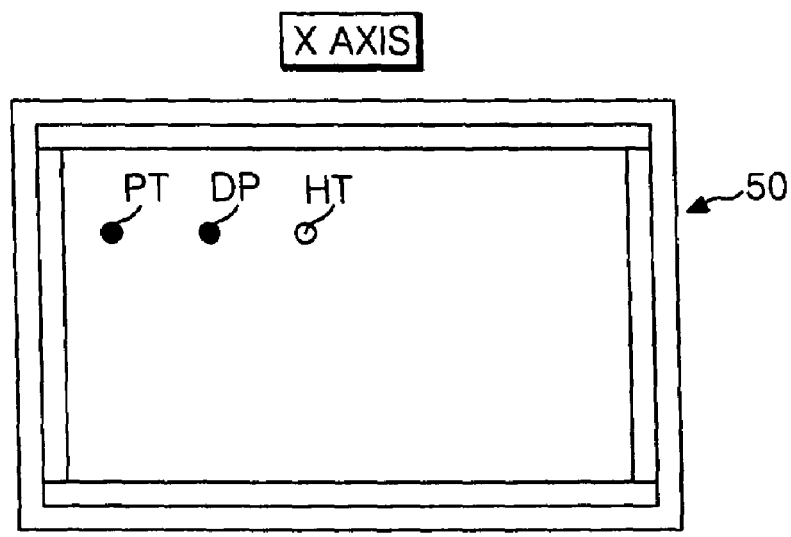
FIG. 5 is a diagram illustrating an exemplary X-axis detection coordinate when double touching occurs on the touch panel depicted in FIG. 4 according to the present invention.

FIG. 5 is a diagram illustrating an exemplary X-axis detection coordinate when double touching occurs on the touch panel depicted in FIG. 4 according to the present invention. In FIG. 5, if double touching occurs for a right-handed user, a hand touch point (HT) may be located along the X-axis direction to the right of the actual point where the pen or the finger touches the panel. In addition, a point (DP) may be a middle point between touch point (PT) of the pen or the finger, and the hand touch point (HT). Hereinafter, a coordinate value of the point (DP) along the X-direction may be referred to as "X-axis coordinate value of the second point," and the coordinate value of the touch point (PT) in the X-axis direction may be referred to as "X-axis coordinate value of the first point." For a right-handed user, the X-axis coordinate value of the second point computed by the microcomputer 74 may be relatively larger than the X-axis coordinate value of the first point, since the coordinate value along the X-axis may increase from left to right. On the contrary, for a left-handed user, the position of the first point coordinate value with respect the second point coordinate value may be opposite to that of the right-handed user. Accordingly, for a left-handed user, the X-axis coordinate value of the second point computed by the microcomputer 74 may be relatively smaller than the X-axis coordinate value of the first point.

Figure 6:
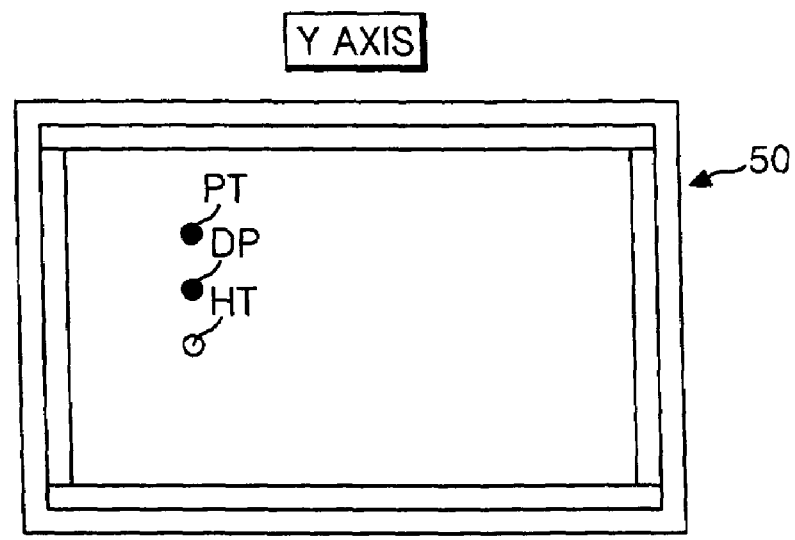
FIG. 6 is a diagram illustrating an exemplary Y-axis detection coordinate when double touching occurs on the touch panel depicted in FIG. 4 according to the present invention.

FIG. 6 is a diagram illustrating an exemplary Y-axis detection coordinate when double touching occurs on the touch panel depicted in FIG. 4 according to the present invention. In FIG. 6, a hand touch point (HT) may be located below the pen or a finger touch point (PT) along the Y-axis direction. In addition, a point (DP) may be a middle point between the touch point (PT) of the pen or the finger, and the hand touch point (HT). Hereinafter, a coordinate value of the point (DP) along the Y-direction may be referred to as "Y-axis coordinate value of the second point," and the coordinate value of the touch point (PT) along the Y-axis direction may be referred to as "Y-axis coordinate value of the first point." Therein, for a right-handed user, the Y-axis coordinate value of the second point computed by the microcomputer 74 may be relatively larger than the Y-axis coordinate value of the first point, since the coordinate value in the Y-axis may increase from top to bottom. Moreover, for a left-handed user, the Y-axis coordinate value of the second point may be larger than the Y-axis coordinate value of the first point.

Figure 7:
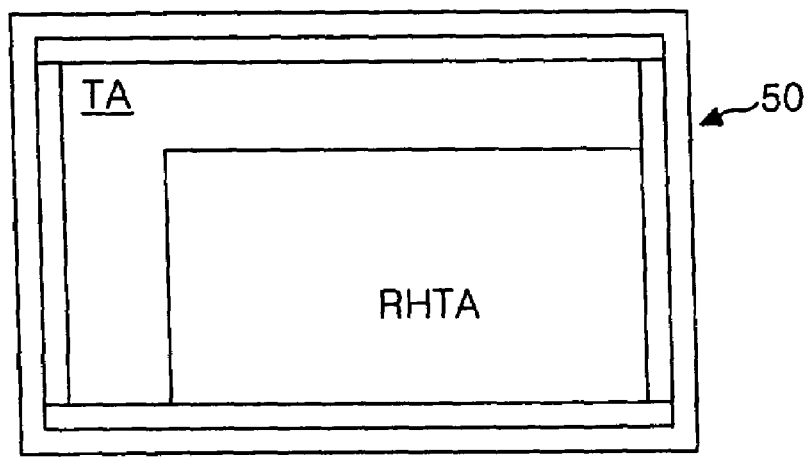
FIG. 7 is a plane view illustrating an exemplary double touching region on the touch panel depicted in FIG. 4 for a right hand user according to the present invention.

FIG. 7 is a plane view illustrating an exemplary double touching region on the touch panel depicted in FIG. 4 for a right hand user according to the present invention. In FIG. 7, for a right-handed user, an X-axis and a Y-axis coordinate value in a touch region (TA) of the touch panel 50 may be relatively large, and double touching may occur frequently in a lower-right region (RHTA) extending to a right and to a bottom of the touch panel.

Figure 8:
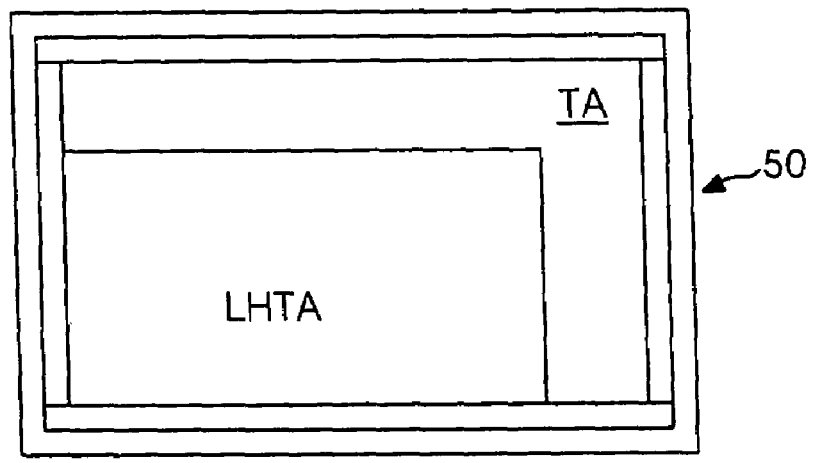
FIG. 8 is a plane view illustrating an exemplary double touching region on the touch panel depicted in FIG. 4 for a left handed user according to the present invention.

FIG. 8 is a plane view illustrating an exemplary double touching region on the touch panel depicted in FIG. 4 for a left handed user according to the present invention. In FIG. 8, for a left-handed user, in a touch region (TA) of a touch panel 50, an X-axis coordinate value may be relatively small and a Y-axis coordinate value may be relatively large. Moreover, double touching may occur in a lower-left region (LHTA) extending to a left and to a bottom of the touch panel. Accordingly, as described above, if the X-axis coordinate value of the double touch reference value is set to 60, and the Y-axis coordinate value of the double touch reference value is set to 80, then, for a right-handed user, the double touch reference value of the right-handed user may be similarly set to +60 along the X-axis direction and to +80 along the Y-axis direction. In contrast, for a left-handed user, the double touch reference value may be set to −60 along the X-axis direction and to +80 along the Y-axis direction.

An activation force (AF) may be set to 80 g~150 g in the region of the right-bottom (RHTA) or the left-bottom (LHTA). Alternatively, the activation force (AF) may be set to 80 g~150 g within the entire touch region including the right-bottom region (RHTA) or the left-bottom region (LHTA). In a further alternative, a different activation force (AF) may be set in accordance with whether double touching is likely to occur in a specific region. For example the activation force (AF) may be set to 80 g~150 g in the right-bottom region (RHTA) or the left-bottom region (LHTA), and may be set to 30 g~80 g in regions other than the RHTA and the LHTA, thereby improving sensitivity in these regions where double touching rarely occurs.

When the second point coordinate value including the X-axis coordinate value of the second point and the Y-axis coordinate value of the second point exceeds the described double touch reference value, the microcomputer 74 may determine the second point coordinate value as an erroneous coordinate value that is due double touching. Moreover, the microcomputer 74 may reject the second point coordinate classified as erroneous, retrieve the first point coordinate value previously stored in storage memory 78 once detected, and transmit it to the system 80. Alternatively, the microcomputer 74 may compute the difference value between the first point coordinate value and the second point coordinate value, compensate the second point coordinate value in accordance with the difference value, and transmit it to the system 80. Herein, the first point coordinate value may include the X-axis coordinate value of the first point and the Y-axis coordinate value of the first point.

The system 80 may receive the coordinate value supplied from the touch panel controller 70 and may execute either the instruction corresponding to the coordinate value or the application program associated with the detected coordinate value. Furthermore, the system 80 may supply the necessary power supply signal and the video data to the display (not shown) where the touch panel 50 may be mounted.

Figure 9A:
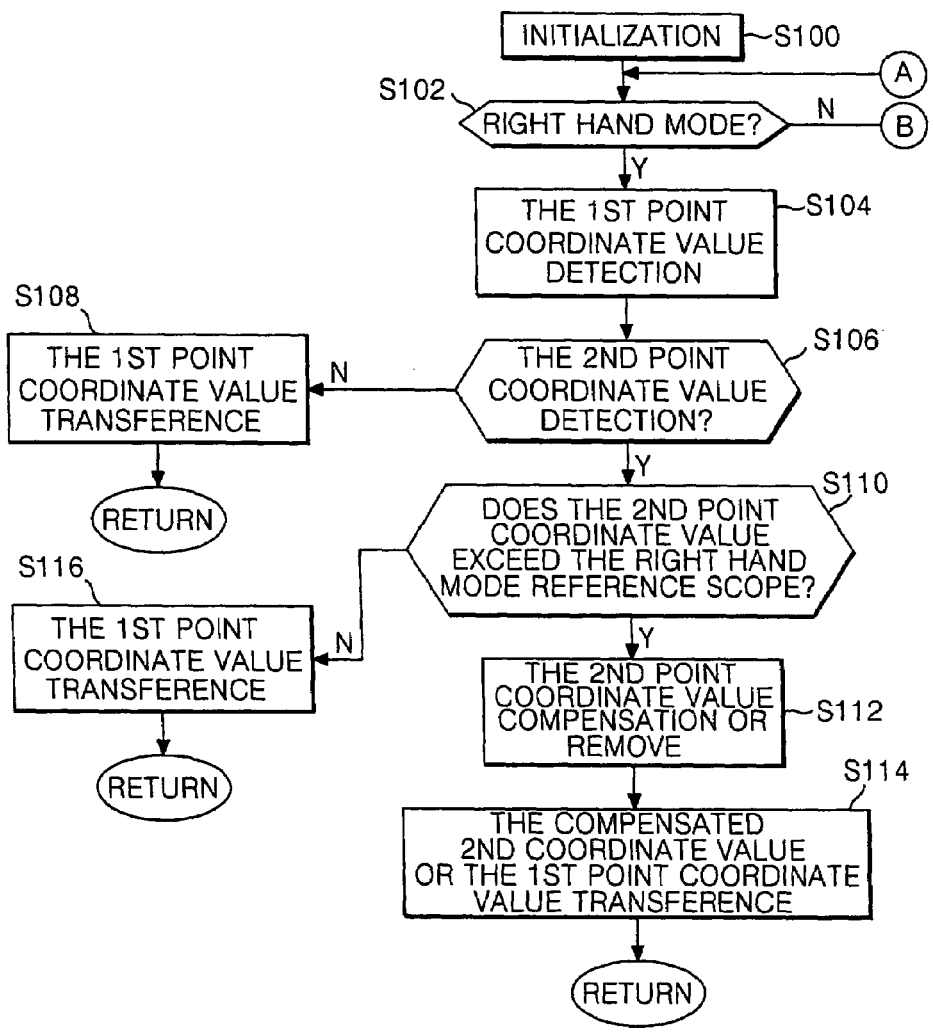
FIGS. 9A and 9B are flow charts illustrating an exemplary step-by-step control method of the touch panel according to the embodiment of the present invention disposed by a microcomputer as depicted in FIG. 4 according to the present invention.
Figure 9B:
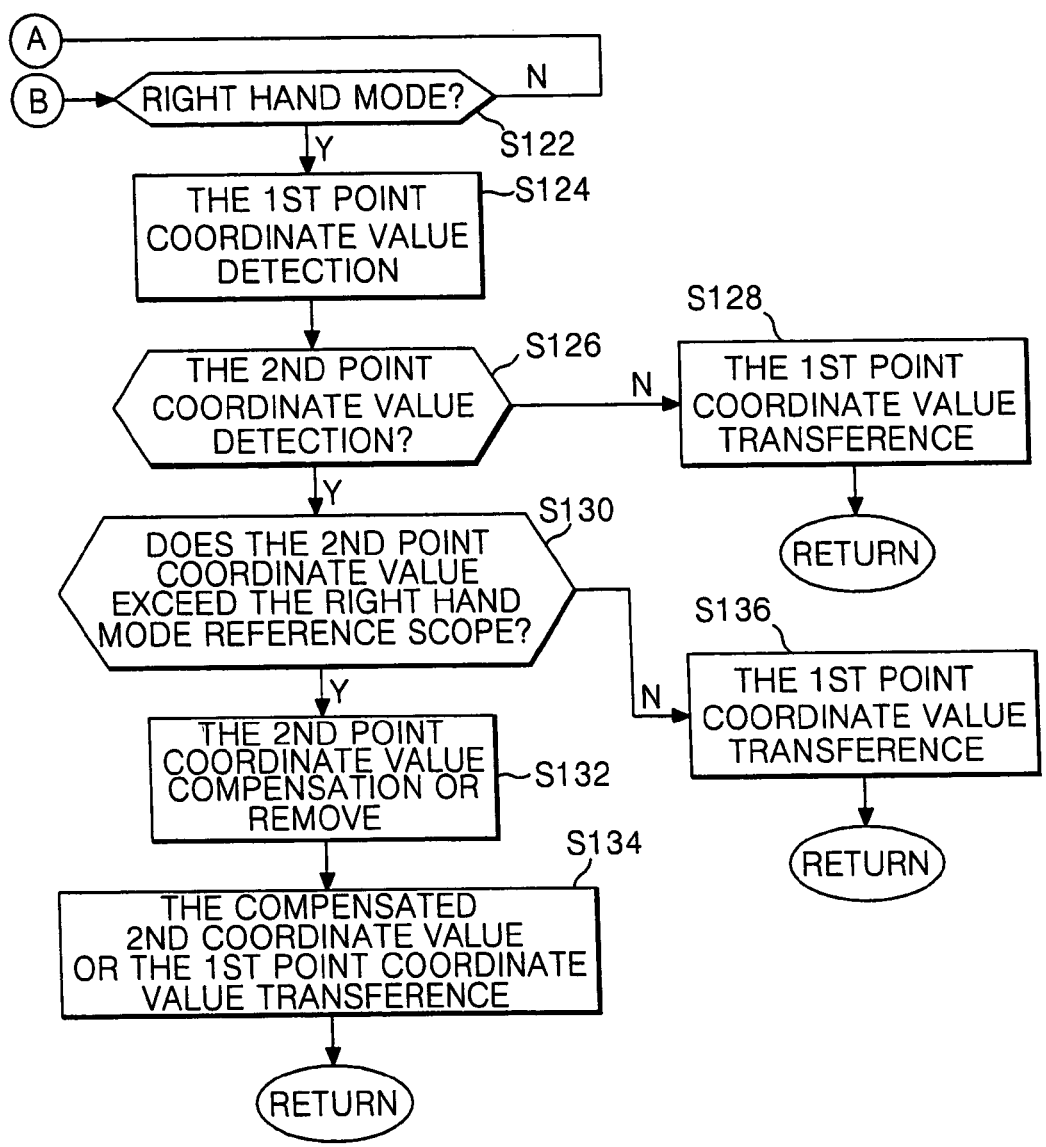

FIGS. 9A and 9B are flow charts illustrating an exemplary step-by-step control method of the touch panel according to the embodiment of the present invention disposed by a microcomputer as depicted in FIG. 4 according to the present invention. The control sequence in FIGS. 9A and 9B may be executed by a microcomputer 74 of a touch panel controller 70.

Referring to FIGS. 9A and 9B, after the microcomputer 74 initializes a touch panel 50 (S100) and determines whether a present mode is a right hand mode or a left hand mode (S102, S202). Various methods may be used to determine whether the user is left-handed or right-handed. For example, a manufacturer of the touch panel may install a mode selection switch in a front of the panel, or include a mode selection switch on a screen display (OSD), or install a special mode selection key in a remote controller.

In the step of S102, if the present mode is the right hand mode, the microcomputer 74 may compute the first point coordinate value about a first touch input from the touch panel 50 through an ADC 72 by the user's touch (S104). Herein, the microcomputer 74, as described above, may combine the X-axis coordinate value and the Y-axis coordinate value sequentially input about the user's first touch and may compute the first point coordinate value. Subsequently, the microcomputer 74 may determine whether the signal for the second touch from the touch panel 50 is provided within a time period where the computed first point coordinate value is transmitted to the system 80. If the signal for the second touch is provided within the time period, the microcomputer 74 may compute the second point coordinate value corresponding to the second touch. Herein, the microcomputer 74, as described above, may combine the X-axis coordinate value and the Y-axis coordinate value sequentially provided for the second touch, and may compute the second point coordinate value (S106).

In the step S106, if the signal for the second touch from the touch panel 50 is not received within the time period, the microcomputer 74 may recognize the first point coordinate value detected in the step S104 as the actual touch point corresponding to the pen or the hand, and may transmit the first point coordinate value unchanged to the system 80 (S108).

Alternatively, in the step S106, if the signal for the second touch received from the touch panel 50 is input within the time period, the microcomputer 74 may determine whether the second point coordinate value computed for the second touch is the coordinate value due to double touching with the right hand (S110). In this case, if the second point coordinate value, as described above, exceeds the preset right hand double touch reference value, the microcomputer 74 may determine the second point coordinate value as an erroneous coordinate value due to double touching with the right hand. For example, if the right hand double touch reference value is set to +60 for the X-axis, to +80 for the Y-axis in the microcomputer 74, and if the X-axis coordinate value of the second point coordinate values is larger than +60 and the Y-axis coordinate value is larger than +80, the microcomputer 74 may determine the second coordinate value computed after the first point coordinate value as an erroneous coordinate value due to double touching.

Similarly, if the second point coordinate value is determined to be an erroneous coordinate value due to double touching with the right hand, more specifically, to the coordinate value of the middle point (DP) between the touch point (PT) by the pen or the finger and the hand touch point (HT), the microcomputer 74 may compute the difference value between the first point coordinate value and the second point coordinate value, and may remove the second point coordinate value (S112) either by compensating the second point coordinate value with the difference value or rejecting the second point coordinate value. Herein, since the second point coordinate value due to double touching with the right hand, as described above, may have the X-axis and the Y-axis coordinate value larger than the first point coordinate value, the microcomputer 74 may compute the difference value between the first point X-axis coordinate value and the second point X-axis coordinate value, and may subtract the difference value from the second point X-axis coordinate value, and may compensate the second point coordinate value by subtracting the difference value between the second point Y-axis coordinate value and the first point Y-axis coordinate value from the second point Y-axis coordinate value.

In the step S112, the second point coordinate value may be compensated when double touching occurs, or the first point coordinate value when the second point coordinate value is rejected, may be recognized as the coordinate value of the actual touching location of the pen or the finger by the microcomputer 74, and may be transmitted to the system 80 through the interface part 76 (S114). Herein, the first point coordinate value may be stored in storage memory 78 under the control of the microcomputer 74, and may be output in the step of S114 from the memory 74.

In step S110, if the second point coordinate value, as described above, does not exceed the preset right hand double touch reference value, the microcomputer 74 may determine the second point coordinate value as the coordinate value of the actual touching position of the pen or the finger. Accordingly, the microcomputer 74 may transmit a second reference coordinate value that does not exceed the right hand double touch reference value unchanged to system 80 (S116).

In step S122, if the user selects the left hand mode, the microcomputer 74 may compute the first point coordinate value for the first touch point associated with a touching of the panel 50 by the user (S114). Herein, the microcomputer 74, as described above, may combine the X-axis coordinate value and the Y-axis coordinate value sequentially received upon touching of the panel by the user, and may compute the first point coordinate value. Subsequently, the microcomputer 74 may determine whether the signal for the second touch from the touch panel 50 is provided within the time period where the computed first point coordinate value is transmitted to the system 80. If the signal for the second touch is provided within the time period, the microcomputer 74 may compute the second point coordinate value (S126) corresponding to the second touch. Herein, the microcomputer 74, as described above, may combine the X-axis coordinate value and the Y-axis coordinate value sequentially provided for the second touch, and may compute the second point coordinate value (S126).

If the signal for the second touch from the touch panel 50 is not received within the time period, the microcomputer 74 may recognize the first point coordinate value detected in the step of S124 as the actual touch point corresponding to the pen or the hand, and may transmit the first point coordinate value unchanged through interface 76 to system 80 (S128).

Alternatively, in step S126, if the signal for the second touch from the touch panel 50 is received within the time period, the microcomputer 74 may determine whether the second point coordinate value for the second touch is an erroneous coordinate value due to double touching with the left hand (S130). In this case, as described above, if the detected second point coordinate value is smaller along the X-direction than the X-axis coordinate value, and larger along the Y-direction than the Y-axis coordinate value of the preset left hand double touch reference value, the microcomputer 74 may determine the second point to be an erroneous coordinate value due to double touching with the left hand. For example, if the left hand double touch reference value is set to −60 for the X-axis and +80 for the Y-axis in the microcomputer 74, when the X-axis coordinate value of the second point is smaller than −60 and the Y-axis coordinate value of the second point is larger than +80, the microcomputer 74 may classify the second point coordinate as an erroneous coordinate value due to double touching.

If the second point coordinate value is determined to be the erroneous coordinate value corresponding to the middle point (DP) between the touch point (PT) by the pen or the finger and the hand touch point (HT), the microcomputer 74 may compute the difference value between the first point coordinate value and the second point coordinate value, and may remove the second point coordinate value by compensating the second point coordinate value in accordance with the difference value or rejecting the second point coordinate value (S132). Herein, the second point coordinate value due to double touching with the left hand, as described above, may have an X-axis coordinate value smaller than the X-axis coordinate value of the first point, and may have a Y-axis coordinate value larger than the Y-axis coordinate value of the first point. Accordingly, the microcomputer 74 may compensate the second point coordinate value by adding the difference value between the first point X-axis coordinate value and the second point X-axis coordinate value to the second point X-axis coordinate value and subtracting the difference value between the first point Y-axis coordinate value and the second point Y-axis coordinate value to the second point Y-axis coordinate value.

The second point coordinate value compensated in the step of S132 when double touching with the left hand occurs, or the first point coordinate value when the second point coordinate value is rejected, may be recognized as the coordinate value for the actual touching location of the pen or the finger by the microcomputer 74, and may be transmitted to the system 80 through the interface part 76 (S134). Herein, the first point coordinate value may be stored in memory 78 under the control of the microcomputer 74, and may be output, in the step S134, from the memory 74.

On the contrary, in step of S130, when the second point coordinate value, as described above, does not exceed the preset left hand double touch reference value, the microcomputer 74 may determine the second point coordinate value as the coordinate value corresponding to the actual touching position of the pen or the finger. Accordingly, in step 136 the microcomputer 74 may transmit the second point coordinate value recognized as the coordinate value corresponding to the pen or the finger touch through the interface part 76 to the system 80 (S136).

It will be apparent to those skilled in the art that various modifications and variations can be made in the touch panel apparatus and method for controlling the same of the present invention without departing from the spirit or scope of the invention. Thus, it is intended that the present invention cover the modifications and variations of the invention provided they come within the scope of the appended claims and their equivalents.

What is claimed is:

1. A touch panel apparatus, comprising:
   a touch panel for recognizing a contact position; and
   a touch panel controller for computing a coordinate value corresponding to the contact position on the touch panel,
   wherein an activation force is set to a value between 80 g-150 g, and the touch panel controller compensates for an error of the coordinate value due to double touching of the touch panel,
   wherein a touch area of the touch panel is partitioned into a first region and a second region, and the activation force is set to the value between 80 g-150 g within the first region of the touch area of the touch panel.

2. The touch panel apparatus of claim 1 wherein the activation force is set to the value between 80 g-150 g within an entire touch area of the touch panel.

3. A touch panel apparatus, comprising:
   a touch panel for recognizing a contact position; and
   a touch panel controller for computing a coordinate value corresponding to the contact position on the touch panel, wherein an activation force is set to a value between 80 g-150 g, and the touch panel controller compensates for an error of the coordinate value due to double touching of the touch panel, wherein the touch panel controller computes a first coordinate value for a first touch generated in the touch panel, and the touch panel controller computes a second coordinate value corresponding to a second touch and determines whether there is an error in the second coordinate value due to a double touching by comparing the second coordinate value to a preset reference coordinate value when an input signal corresponding to the second touch is received within a predefined time period.

4. The touch panel apparatus of claim 3, wherein the touch panel controller determines the second coordinate value to be erroneous when the second coordinate value exceeds the preset reference coordinate value.

5. The touch panel apparatus of claim 4, wherein the reference coordinate value is determined between a middle value and a location value corresponding to a real touch point, and the middle value is between the real touch point and the hand touch point upon double touching.

6. The touch panel apparatus of claim 3, wherein the touch panel controller compensates the second coordinate value in accordance with a difference value from the first coordinate value when an error in the second coordinate value due to a double touching is detected.

7. The touch panel apparatus of claim 6, wherein the touch panel controller compensates the second coordinate value by subtracting the difference value from the second coordinate value.

8. The touch panel apparatus according to claim 6, wherein the touch panel controller compensates the second coordinate value by adding the difference value to the second coordinate value.

9. A touch panel apparatus, comprising:
a touch panel for recognizing a contact position on the touch panel; and
a touch panel controller for computing a coordinate value corresponding to the contact position on the touch panel,
wherein an activation force is set to a value between 80 g-150 g, and the touch panel rejects one of a plurality of coordinate values when double touching generates the plurality of coordinate values,
wherein a touch area of the touch panel is partitioned into a first region and a second region, and the activation force is set to the value between 80 g-150 g within the first region of the touch area of the touch panel.

10. The touch panel apparatus of claim 9, wherein the activation force is set to the value between 80 g-150 g within an entire touch area of the touch panel.

11. A touch panel apparatus, comprising:
a touch panel for recognizing a contact position on the touch panel; and
a touch panel controller for computing a coordinate value corresponding to the contact position on the touch panel,
wherein an activation force is set to a value between 80 g-150 g, and the touch panel rejects one of a plurality of coordinate values when double touching generates the plurality of coordinate values,
wherein the touch panel controller computes a first coordinate value for a first touch generated in the touch panel, and the touch panel controller computes a second coordinate value corresponding to a second touch, and determines whether there is an error in the second coordinate value due to a double touching by comparing the second coordinate value to a preset reference coordinate value when an input signal corresponding to the second touch is received within a predefined time period.

12. The touch panel apparatus of claim 11, wherein the touch panel controller determines the second coordinate value to be erroneous when the second coordinate value exceeds the preset reference coordinate value.

13. The touch panel apparatus of claim 11, wherein the reference coordinate value is determined between a middle value and a location value corresponding to a real touch point, and the middle value is between the real touch point and the hand touch point upon double touching.

14. The touch panel apparatus of claim 12, wherein the touch panel controller rejects the second coordinate value when the second coordinate value is determined to be erroneous.

15. A method for controlling a touch panel apparatus comprising the steps of:
specifying a value for an activation force to be used as a reference for recognizing when the touch panel is touched at a touching position;
computing a first coordinate value for a first touch generated in the touch panel and computing a second coordinate value corresponding to a second touch when an input signal corresponding to the second touch is received within a predefined time period;
generating a preset reference coordinate value;
determining whether there is an error in the second coordinate value due to a double touching by comparing the second coordinate value to the preset reference coordinate value; and
compensating the error of the second coordinate value due to double touching of the touch panel.

16. The method of claim 15, wherein the step of determining includes determining the second coordinate value to be erroneous when the second coordinate value exceeds the preset reference coordinate value.

17. The method of claim 15, wherein the reference coordinate value is determined between a middle value and a location value corresponding to a real touch point, and the middle value is between the real touch point and the hand touch point upon double touching.

18. The method of claim 15, wherein the step of compensating the error of the coordinate value further includes compensating the second coordinate value in accordance with a difference value from the first coordinate value when there is an error in the second coordinate value due to a double touching.

19. The method of claim 18, wherein the step of compensating the error of the coordinate value further includes subtracting the difference value from the second coordinate value, thereby compensating the second coordinate value.

20. The method of claim 18, wherein the step of compensating the error of the coordinate value further includes adding the difference value to the second coordinate value, thereby compensating the second coordinate value.

21. A method for controlling a touch panel apparatus, comprising the steps of:
specifying a value for an activation force to be used as a reference for recognizing when the touch panel is touched at a touching position on the touch panel;
computing a coordinate value corresponding to the touching position on the touch panel, including computing a first coordinate value for a first touch generated in the touch panel and computing a second coordinate value corresponding to a second touch when an input signal corresponding to the second touch is received within a predefined time period; and generating a preset reference coordinate value; and determining whether there is an error in the second coordinate value due to a double touching by comparing the second coordinate value to the preset reference coordinate value rejecting one of a plurality of coordinate values when double touching of the panel generates the plurality of coordinate values.

22. The method of claim 21, wherein the step of determining includes determining the second coordinate value to be erroneous when the second coordinate value exceeds the preset reference coordinate value.

23. The method of claim 22, wherein the second coordinate value is the coordinate value rejected in the step of rejecting when there is an error in the second coordinate value due to a double touching.

24. The method of claim 21, wherein the reference coordinate value is determined between a middle value and a location value corresponding to a real touch point, and wherein the middle value is between the real touch point and the hand touch point upon double touching.

* * * * *